United States Patent [19]
Dettelbach et al.

[11] Patent Number: 5,253,166
[45] Date of Patent: Oct. 12, 1993

[54] PRE-TICKET TRAVEL RESERVATION RECORD KEEPING SYSTEM

[75] Inventors: Susan S. Dettelbach; Kenneth Dettelbach, both of Mayfield Heights, Ohio

[73] Assignee: Disc Corporation, Willoughby, Ohio

[21] Appl. No.: 677,556

[22] Filed: Mar. 29, 1991

[51] Int. Cl.⁵ .............................................. G06F 15/00
[52] U.S. Cl. .................................................... 364/407
[58] Field of Search ............................................ 364/407

[56] References Cited

U.S. PATENT DOCUMENTS

| | | | |
|---|---|---|---|
| 4,788,643 | 11/1988 | Trippe et al. | 364/407 |
| 4,845,625 | 7/1989 | Stannard | 364/407 |
| 4,885,685 | 12/1989 | Wolfberg et al. | 364/401 |
| 5,021,954 | 6/1991 | Webber et al. | 364/407 |

Primary Examiner—Roy N. Envall, Jr.
Assistant Examiner—Ari M. Bai
Attorney, Agent, or Firm—Fay, Sharpe, Beall, Fagan, Minnich & McKee

[57] ABSTRACT

A record keeping system communicates with an airline's customer reservation system and a corporate client database system. A dedicated queue within the customer reservation system is accessed daily by the record keeping system to download data comprising travel itineraries. A relational database control within the record keeping system organizes the pre-travel data for efficient use by a corporate client. The reorganized data thus downloaded and organized is sent daily to the corporate clients for use in their own local database systems.

7 Claims, 10 Drawing Sheets

```
SALES PERSON : 32          ITINERARY          DATE : 30 APR 90

CUSTOMER NBR : 010200           QKSOBV    PAGE : 1

TO : ABC COMPANY
       25701 ABC PARK DR
       BEACHWOOD OH  44122

FOR : TRAVELER / JOHN    REF : 4150      ADV : AH1D8730

02 MAY 90  -  WEDNESDAY

AIR    DELTA AIR LINES INC  FLT : 379  COACH
          LV CLEVELAND              715A   EQP : 727 STRETCH
          AR CINCINNATI             813A   NON - STOP

AIR    DELTA AIR LINES INC  FLT : 687  COACH    BREAKFAST
          LV CINCINNATI             905A   EQP : 737 STRETCH
          AR HOUSTON   HOBBY       1030A   NON - STOP

CAR    OKLAHOMA CITY NATIONAL CAR RENTAL     1-STD CAR AUTO A/C
          PICK UP - 6P
          RETURN - 03 MAY
          CONFIRMATION NUMBER   0525607545

HOTEL  ES EMBASSY SUITES OKLAHOMA CI   01 NIGHT OUT - 03 MAY
          OKLAHOMA CITY                   1 ROOM CORPORATE
          1815 SOUTH MERIDIAN             RATE - 75.00 PER NIGHT
          OKLAHOMA CITY OK 73108          GUARANTEED LATE ARRIVAL
          FONE  405 - 682 - 6000          CONFIRMATION 64469071

03 MAY 90  -  THURSDAY

AIR    UNITED AIRLINES  FLT : 2872  ECONOMY
          LV HOUSTON   HOBBY        310P   EQP : ATP PROPLR
          AR CHICAGO OHARE          400P   NON - STOP

UNITED AIRLINES  FLT : 998   ECONOMY
          LV CHICAGO OHARE          505P   EQP : DC-8 STRETCH
          AR CLEVELAND              716P   NON - STOP
             RESERVED SEATS 21B

U1 - DEPT. 4150
U2 - AUTH. 1249
U3 - 0425 A1 C5 H5 T2 / Y
U4 - 928      FARE
U5 - 1044     COACH FARE
U6 - 928      LOW FARE
U7 - 45       DAILY RATE
```

FIG. 3

HEADING AND FOOTER INFORMATION
    PNR NUMBER
    INVOICE DATE
    TRAVELER'S NAME
    COMPANY NAME
    DEPARTMENT NUMBER
    AUTHORIZATION NUMBER
    TRAVEL CODES AIR LEGS
    AIRLINE
    FLIGHT NUMBER
    DEPART AND ARRIVE CITY
    DEPART AND ARRIVE DATE
    DEPART AND ARRIVE TIME
    CLASS OF SERVICE
    FARE BASIS TOTAL AIR FARES
    AIR RATES
    COACH FARE
    LOW FARE HOTEL DATA
    COMPANY
    LOCATION
    CHECK IN AND CHECK OUT DATE
    ROOM TYPE
    FARES
    CONFIRMATION NUMBER
    ADDRESS
    PHONE NUMBER CAR DATA
    COMPANY
    DROP OFF AND PICK UP CITIES
    DROP OFF AND PICK UP DATES
    TYPE OF CAR
    CAR RATES
    CONFIRMATION NUMBER

FIG. 4

| T | 1 | 2 | 3 | 4 | 5 | 6 | 7 | 8 |
|---|---|---|---|---|---|---|---|---|
| B | PNR# | | | | | | | |
| P | PNR# | | MASDATCH | | | INDLAST | INDFIRST | INDCOMP |
| D | PNR# | TRAVCODE | | | | | | |
| N | PNR# | DEPTNO | AUTHNO | | | | | |
| T | PNR# | CARCOMP | CARALOC | CARDLOC | CARADATE | CARDOATE | CARCLASS | CARFARE |
| H | PNR# | HOTCOMP | HOTLOC | HOTADATE | HOTDDATE | HOTCLASS | HOTFARE | HOTCOMF# |
| A | PNR# | TAIRCODE | TAIRFLT# | TAIRDCIT | TAIRACIT | TAIRDTIM | TAIRATIM | TAIRDOAT |
| E | PNR# | RECORDS | | | | | | |

FIG. 5A

| 9 | 10 | 11 | 12 | 13 | 14 | 15 | 16 | 17 |
|---|---|---|---|---|---|---|---|---|
|   |   |   |   |   |   |   |   |   |
|   | INDAGENT | INDCUST |   |   |   |   |   |   |
|   |   |   |   |   |   |   |   |   |
| CARCONF# |   |   |   |   |   |   |   |   |
|   | HOTADD1 | HOTADD2 | HOTSTTE | HOTZIP |   |   |   |   |
|   | TAIRCLAS | TAIRRATE |   | TAIRBAS |   | TAIRCOAC | TAIRLOW |   |
| TAIRADAT |   |   |   |   |   |   |   |   |

PRE-TICKET TRAVEL RESERVATION RECORD KEEPING SYSTEM

BACKGROUND OF THE INVENTION

This invention pertains to the art of travel record keeping systems, and more particularly to apparatus and control systems for retrieving and organizing travel reservation data. The invention is specifically applicable to retrieving and organizing pre-travel data for comparison use by corporate clients. The record keeping system apparatus may be implemented through use of a modified general purpose computer such as an IBM PC and will be described with particular reference thereto. It will be appreciated, though, that the invention has broader applications such as the ability to monitor company travel plans prior to the travel occurring to ensure that corporate employees use available discounts whenever possible without altering the service quality. Corporate travel policy compliance and contract compliance, indicated by system exception codes are also areas of application of the instant system. Corporate travel expenses may therefore be managed pro-actively, based on accurate pre-travel information.

In general, "pre-travel" includes the period between reservation initiation, through ticketing, and up to the actual departure time of the traveler.

The recent increase in the cost of business travel has forced many companies to focus on cost savings techniques for reducing the travel expense component of doing business. In general, travel expenses represent the third largest administrative expense within a corporation. Expense reductions in travel fall directly to the corporate bottom line, especially in situations where the same travel is received for less cost.

Lately, the travel industry has become highly competitive, characterized by airline deregulation and overcapacity. This situation offers numerous opportunities for companies to reduce costs, often while improving the quality of travel service to its travelling employees provided some action is taken before the actual travel takes place. Several keys have been identified for controlling company travel costs and improving travel quality including: monitoring company travel plans prior to the travel occurring and ensuring whenever possible, that employees use available discounts without altering the service quality; negotiating sustainable discounts and service upgrades with the appropriate travel vendors; and, managing corporate travel expenses pro-actively based upon accurate pre-travel information.

The importance of monitoring the company travel plans prior to the travel occurring is pivotal for insured use of available discounts without altering the service quality or, in the alternative, service level upgrades. In general, once ticketed, the opportunity for discounts and cost control is lost, although upgrades can occur until departure.

In the past, only historical travel reports were available, charting post-ticket itineraries. Alternately, a tedious procedure of manual sorting of pre-travel information was also used with limited success. As the number of persons at any given time increases, along with constant fare, schedule, and itinerary changes, the time constraints imposed by the manual methods rendered those schemes impractical and virtually useless.

It has, therefore, been deemed desirable to provide an automated economical solution that meets the needs of corporations with a substantial travel expense component.

SUMMARY OF THE INVENTION

The present invention contemplates a new and improved pre-ticket travel reservation record keeping system and apparatus which overcomes the above referenced problems and provides a corporation with the ability to receive and logically arrange pre-travel information on a daily basis.

According to the present invention, a serial input/output port communicates pre-travel data from a remote source to a relational database control through a serial interface control.

According to a more limited aspect of the invention, the system includes a plurality of files and databases integrated through the serial interface control and a relational database control. A means for inputting the pre-travel data from one or more customer airline computer reservation systems and into a raw data file is provided, another control means converts the raw data file into a machine readable transfer file suitable for input by the single common relational database control.

According to another aspect of the invention, an input command control procedure inputs the data contained within the transfer file into the relational database control through a series of validation procedures to ensure data integrity.

According to yet another aspect of the invention, the relational database control comprises a plurality of databases including current tables of the data downloaded daily from the customer reservation systems, and historical tables comprising a history of pre-travel data received and stored at an earlier time.

According to still another aspect of the invention, information from an airline back office accounting system is downloaded into a relational database for efficient and accurate bookkeeping.

A primary advantage of the invention resides in the ability to efficiently receive and interpret pre-travel data in a logical manner to take advantage of available discounts and service level upgrades, where possible.

Another advantage of the invention is found in the convenient reporting of the pre-travel itinerary for verification of resource coordination presented to corporate personnel while traveling.

Yet another advantage of the invention is found in the ability to pro-actively manage corporate travel expenses based on accurate pre-travel information available on a daily basis.

Still yet another advantage of the invention is the maintenance of history reports for management of historical travel information. These reports are useful for group discount negotiations and for tracking corporate policy and contract compliance.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENTS

Referring now to the drawings, wherein the showings are for the purposes of illustrating the preferred embodiment of the invention only and not for purposes of limiting the same, the FIGURES show a travel reservation record keeping system 10 formed in four general units including a serial input/output port A, a serial interface control unit B, and a relational database control unit C. A remote intelligent device H may become a part of the system when connected by a communication line as, for example a MODEM. A printer D, a video screen E, and a keyboard F may also be added to the record keeping system 10, which may be based upon a personal computer such as an IBM PC or other suitably dedicated hardware comprising a microprocessor, memory and device interface. The remote device R is in communication with the system 10 through communication ports G and I.

The record keeping system 10 is capable of communication with one or more customer airline computer reservation systems CRSs through a local device T running proprietary software and having a MODEM connection with the CRSs and a serial printer output port. Each CRS contains a suitable queue file Q99 for retention of customer travel data pertaining to travelers serviced by the system 10. The queue Q99 is updated in real-time as reservations are taken by travel agents or the like.

An appropriate time of day is selected for a scheduled download of all the data contained within the queue Q99 file, which in the preferred embodiment is selected to be 6:00 pm. The local proprietary device T establishes communication with the airline reservation system CRS as by MODEM or other means. At the preselected scheduled time, the record keeping system is readied for capture of data from the device T. Upon a dedicated print signal from the device T, the airline computer reservation system CRS dumps the data contained within queue Q99 to the device T for printing via serial interface.

To the device T, the record keeping system 10 "looks" like a standard printer or standard bulk data buffer often used in conjunction with a slow printer and fast communication channel. In general, the serial interface control unit B within the system 10 handles the necessary communication protocol in order that the data within queue Q99 may be efficiently retrieved.

The serial interface control B is written in a high level language source code such as C to run under the well-known operating systems of PC-DOS or MS-DOS within IBM-PC compatible personal computers. The executable code is loaded into RAM from disk when called to execute by the record keeping system 10.

More particularly with reference to FIGS. 1a–2b, the serial interface control B has generally four operator-selectable functions: collect data 100; condition data for R:Base 102; configure serial port 104; and, exit 106. The source code for the interface program is provided in Appendix II below.

Collect Data 100

Figure 3:
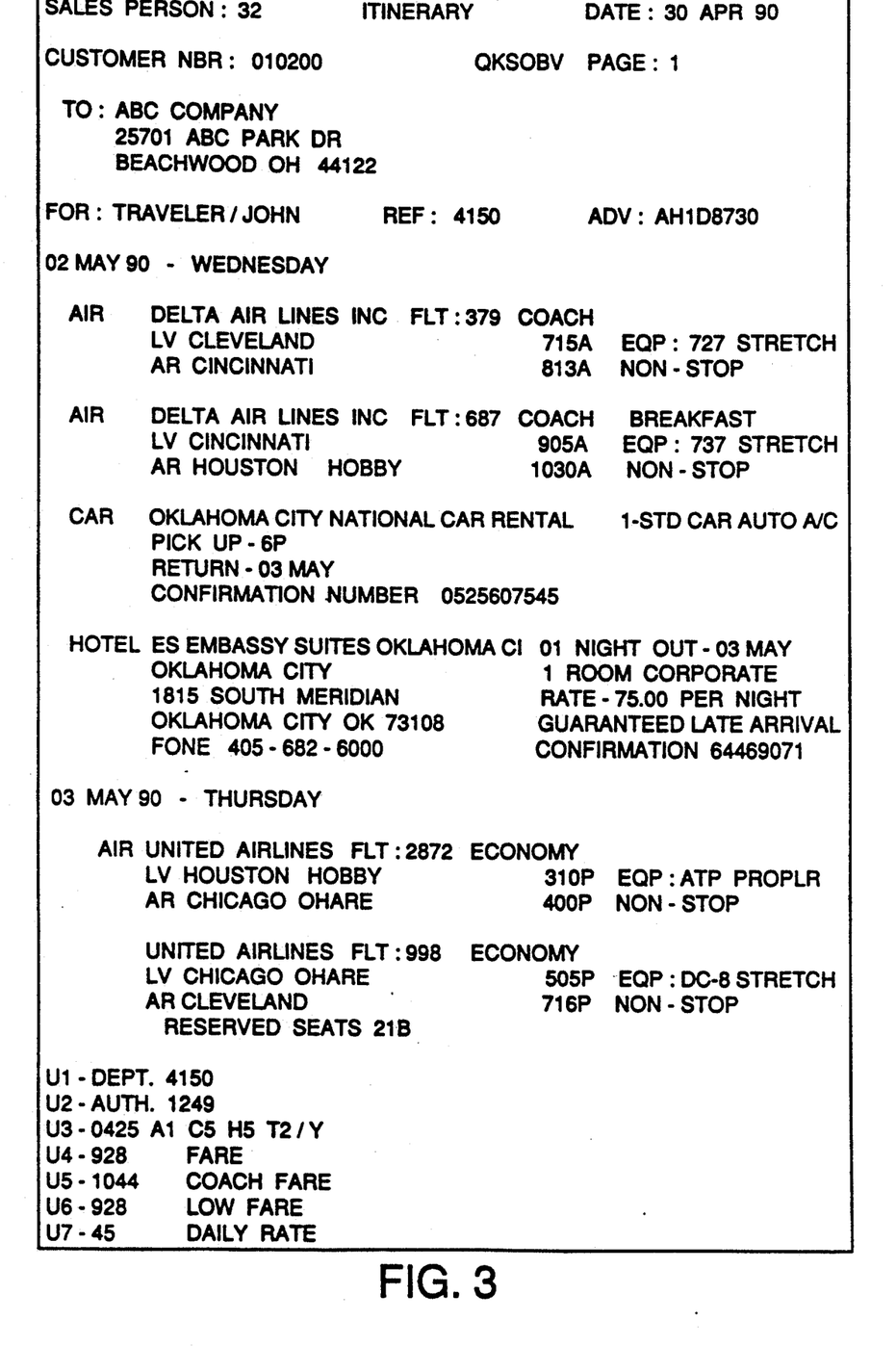
FIG. 3 is an illustration of the form of raw data available from a typical customer airline computer reservation system.

The interface control program B prompts the operator for a file name to write the imported information within the record keeping system 10. After entering the file name without a DOS extension, the interface program checks the I/O serial part A and issues a message to the sending unit CRS to begin data transmission into a file created having the selected file name and a ".RAW" extension 12. The communication link may be established via MODEM and well-known techniques according to the RS232C standard and the many variations thereof. Hardware and/or software communication protocols may be used for handshaking. A representation of the pre-travel itinerary data contained in the raw data file 12, or reservation data set, is illustrated in FIG. 3. The FIGURE is a partial, but representative, example of the overall contents of the raw data file 12 which may contain the travel itineraries of a large number of customers, wherein the FIGURE illustrates the travel itinerary of only a single person.

Condition Data for RBase 102

The ultimate output from the serial interface control B is the ".RAW" file 12, converted into ASCII delimited format as a transfer file 20, arranged for use by the relational database control C. The conditioned output file becomes the transfer file 20 and is assigned a ".XFR" extension. All characters and character strings in the transfer file 20 are delimited by quotes. All fields are separated by commas.

Each reservation retrieved from the queue file Q99 is bracketed by a Record Header and Record Trailer. The Record Trailer contains a field indicating the number of records between the Header and Trailer, which is used in subsequent error trapping.

Figure 4:
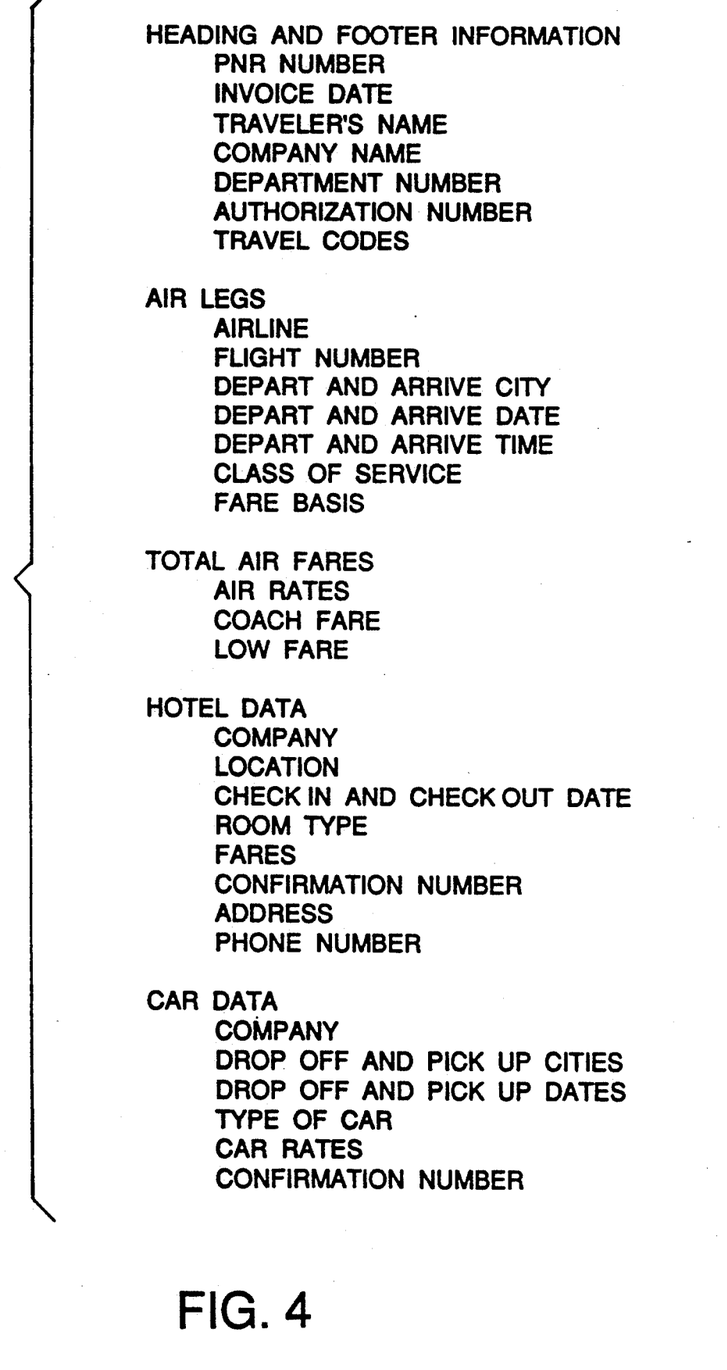
FIG. 4 illustrates the data item types available from the raw pre-travel data illustrated in FIG. 3.
Figure 5A:
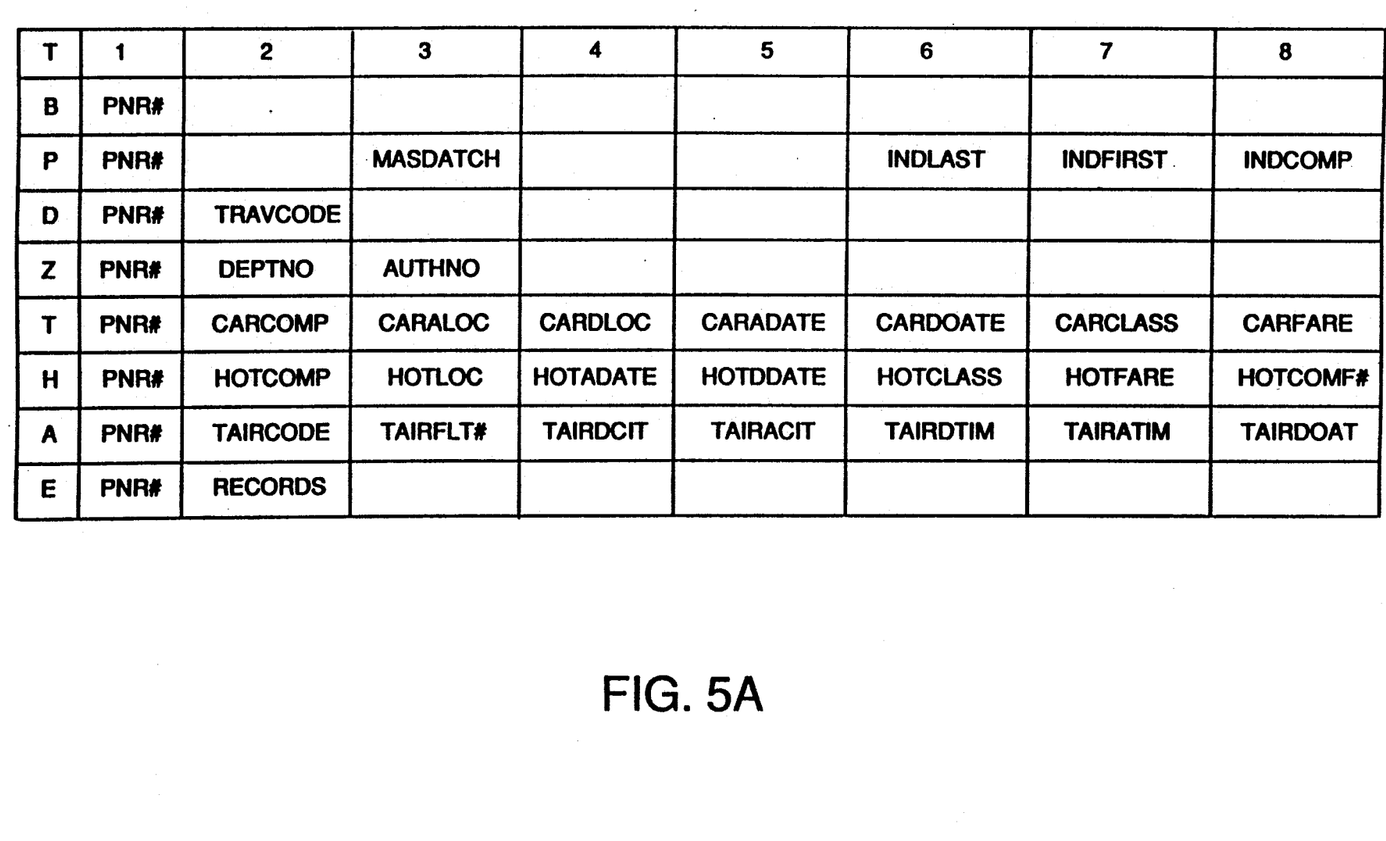
FIGS. 5a and 5b are a representative data table portion within the relational database control unit.
Figure 5B:
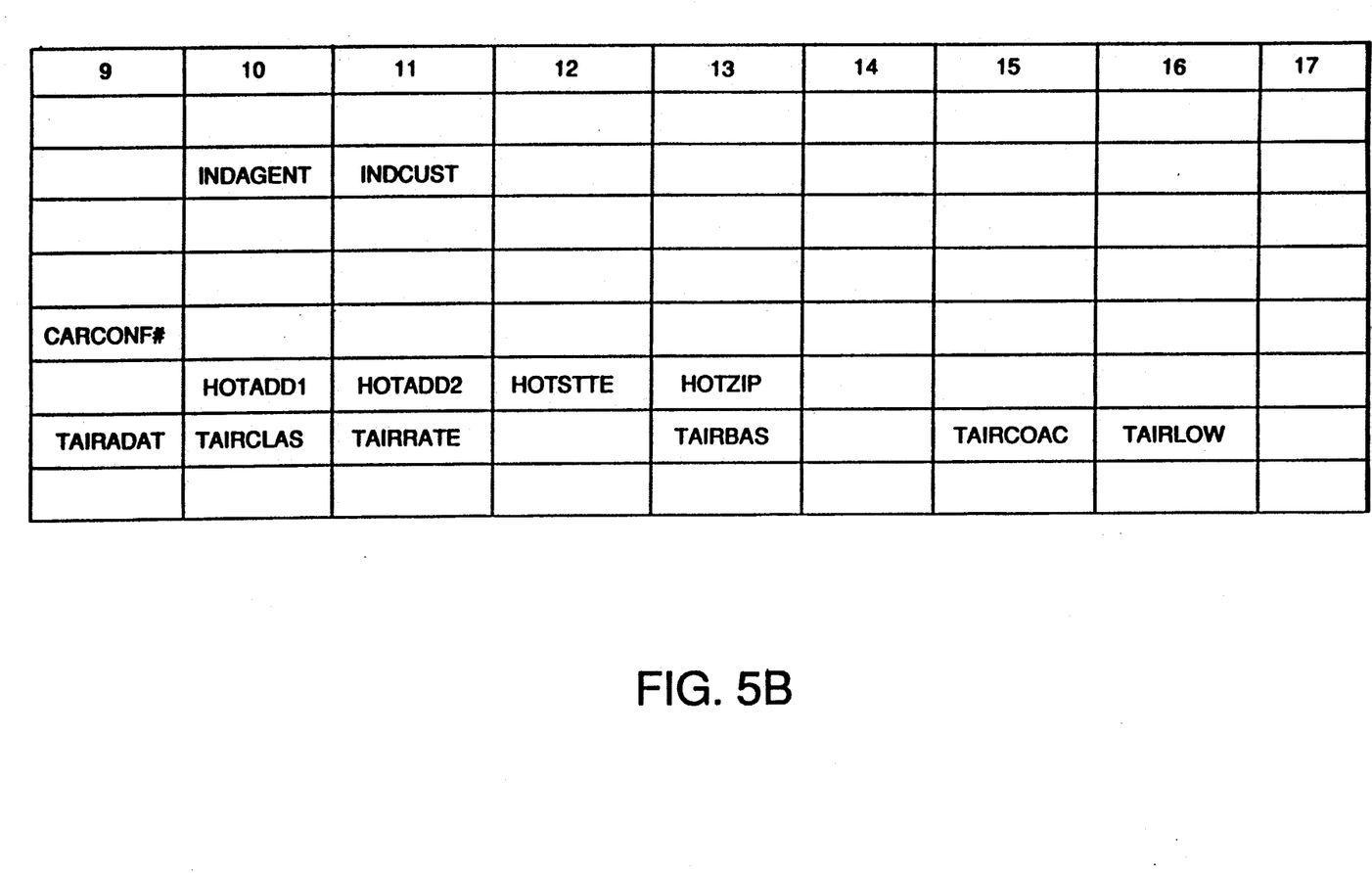

Between the Header and Trailer are records delineating the customer data, department authorization, and air, hotel and automobile reservations. The selected travel itinerary data items that are "picked" from the raw data file 12 are listed in FIG. 4, wherein all items listed are extracted from the raw data file shown in FIG. 3.

All information in the Transfer File (".XFR") 20 is ASCII character data. Each field is delimited with double quotes, and the fields are separated by commas within the table segments. This facilitates the selective arrangements of the items within the memory as shown. The various segments are detailed below.

| | Record Header (Begin Reservation) |
|---|---|
| Format: | Record_Type, Passenger_name_reservation_number |
| Where: | Record_Type is a valid record type (see Valid Record Types) |
| Sample: | "B", "PNR#" |
| | Record Trailer (End Reservation) |
| Format: | Record_Type, Reference_Number |

-continued

| | |
|---|---|
| Where: | Number_of_Records_in_Reservation<br>Record_Type is a valid record type<br>(see Valid Record Types)<br>Number_of_Records_In_Reservation is<br>the number of items between the<br>Begin and the End markers. This<br>field should be used for validating<br>on the ASCII input portion of the<br>RBase program. |
| Sample: | "E", "PNR#", "14" |

Customer Data

| | |
|---|---|
| Format: | Record_Type, Reference_Number,<br>Transaction Date, Customer_Code,<br>Name, Address1, Adress2, City,<br>State, Country, Address_Code {, Zip<br>Code} |
| Where: | Record_Type is a valid record type<br>(see Valid Record Types) |
| Sample: | "P", "PRN#", "MASTIMCH", "MASDATCH",<br>"MASDATEN", "UPDTFLAG", "INDLAST",<br>"INDFIRST", "INDCOMP", "CLCODE",<br>"INDAGENT", "INDCUST" |

Air Travel Reservation Data

| | |
|---|---|
| Format: | Record_Type, PNR_Number, Airline,<br>Flight_Number, Depart._City,<br>Arrive_City, Depart_Time,<br>Arrive_Time, Depart_Date,<br>Arrive_Date, Service_Class, Fare,<br>Coach_Fare, Low_Fare, |
| Where: | Record_Type is a valid record type<br>(see Valid Record Types)<br>Reference_Number is the Itinerary<br>Reference Number assigned in Denver<br>for example. |
| Sample: | "A", "PNR#", "TAIRCODE", "TAIRFLT#",<br>"TAIRDCIT", "TAIRACIT", "TAIRDTIM",<br>"TAIRATIM", "TAIRDDAT", "TAIRADAT",<br>"TAIRCLAS", "TAIRRATE", "   ",<br>"TAIRBAS", "   ", "TAIRCOAC",<br>"TAIRLOW", "TAIRSEG#", "UPDTFLAG" |

Transportation Rental Data

| | |
|---|---|
| Format: | Record_Type, PNR_Number,<br>Car_Company, Pickup_Location,<br>Dropoff_Date, Car_Type, Car_Rate,<br>Confirmation_Number |
| Where: | Record_Type is a valid record type<br>(see Valid Record Types)<br>Reference_Number is the Itinerary<br>Reference Number assigned in Denver. |
| Sample: | "T", "PNR#", "CARCOMP", "CARALOC",<br>"CARDLOC", "CARADATE", "CARDDATE",<br>"CARCLASS", "CARFARE", "CARCONF#",<br>"   " |

Hotel Booking Data

| | |
|---|---|
| Format: | Record_Type, PNR_Number,<br>Hotel_Company, Hotel_Location,<br>Arrive_Date, Depart_Date, Room_Type,<br>Room_Rate, Confirmation_Number,<br>Address_1, Address_2, Hotel_State,<br>Hotel_Zip |
| Where: | Record_Type is a valid record type<br>(see Valid Record Types)<br>Reference_Number is the Itinerary<br>Reference Number assigned in Denver. |
| Sample: | "H", "PNR#", "HOTCOMP", "HOTLOC",<br>"HOTADATE", "HOTDDATE", "HOTCLASS",<br>"HOTFARE", "HOTCONF#", "   ",<br>"HOTADD1", "HOTADD2", "HOTSTTE",<br>"HOTZIP", "   " |

Travel Data Code

| | |
|---|---|
| Format: | Record_Type, Reference_Number,<br>Travaco_Data_Code |
| Where: | Record_Type is a valid record type<br>(see Valid Record Types)<br>Reference_Number is the Itinerary<br>Reference Number assigned in Denver.<br>Travaco_Data_Code is the two letter<br>code used by record keeping system<br>operator to assign attribute to a<br>customer or their itinerary. |
| Sample: | "D", "PNR#", "A3" |

-continued

DEPARTURE AUTHORIZATION

| | |
|---|---|
| Format: | Record_Type, PRN_Number,<br>Dept_Number, Authorization_Number |
| Where: | Record-Type is valid record type<br>See Valid Record Type) |
| Sample: | "Z", "PNR#", "DEPTNO", "AUTTHNO" |

VALID RECORD TYPES

"A" - Airline Reservation
"B" - Begin Reservation
"D" - Travel Data Code
"E" - End Reservation
"H" - Hotel Rental
"P" - Client (Purchaser) Information
"T" - Transportation Rental
"Z" - Department Authorization Configure Serial Port 104

This option allows the operator to change communication parameters including the baud rate, protocol and assigned serial port.

Exit 106

The Exit option returns the user to the operating system.

RELATIONAL DATABASE CONTROL INTERFACE

In addition to the serial interface control B running under DOS, the relational database control C is also implemented to be used in DOS. Any of the available well-known relational database packages may be used as a framework for the database control C, such as for example, R:BASE published by Microrim or Paradox published by Borland International. In the preferred embodiment, R:Base is used. All of the menus, batch processing, and database commands used in conjunction with the relational database control interface discussion below, are listed in Appendix III. It is understood by those skilled in the art, of course, that the off-the-shelf frameworks must be modified or "programmed" to each individual customized application. Guidelines for customizing according to the preferred embodiment are detailed below and in the accompanying Appendices wherein Appendix I illustrates the Table structure used in the preferred embodiment. As also would be appreciated by those of ordinary skill in the art, the methods described below may be extended to areas of corporate accounting, wherein airline back office accounting systems may source raw accounting information for importation into the relational database of the preferred embodiment. Once organized in a manner corresponding to preferred embodiment methods, corporate accountants may easily retrieve pre-formatted and manageable account information from such systems as ADS and TS2000.

Figure 1A:
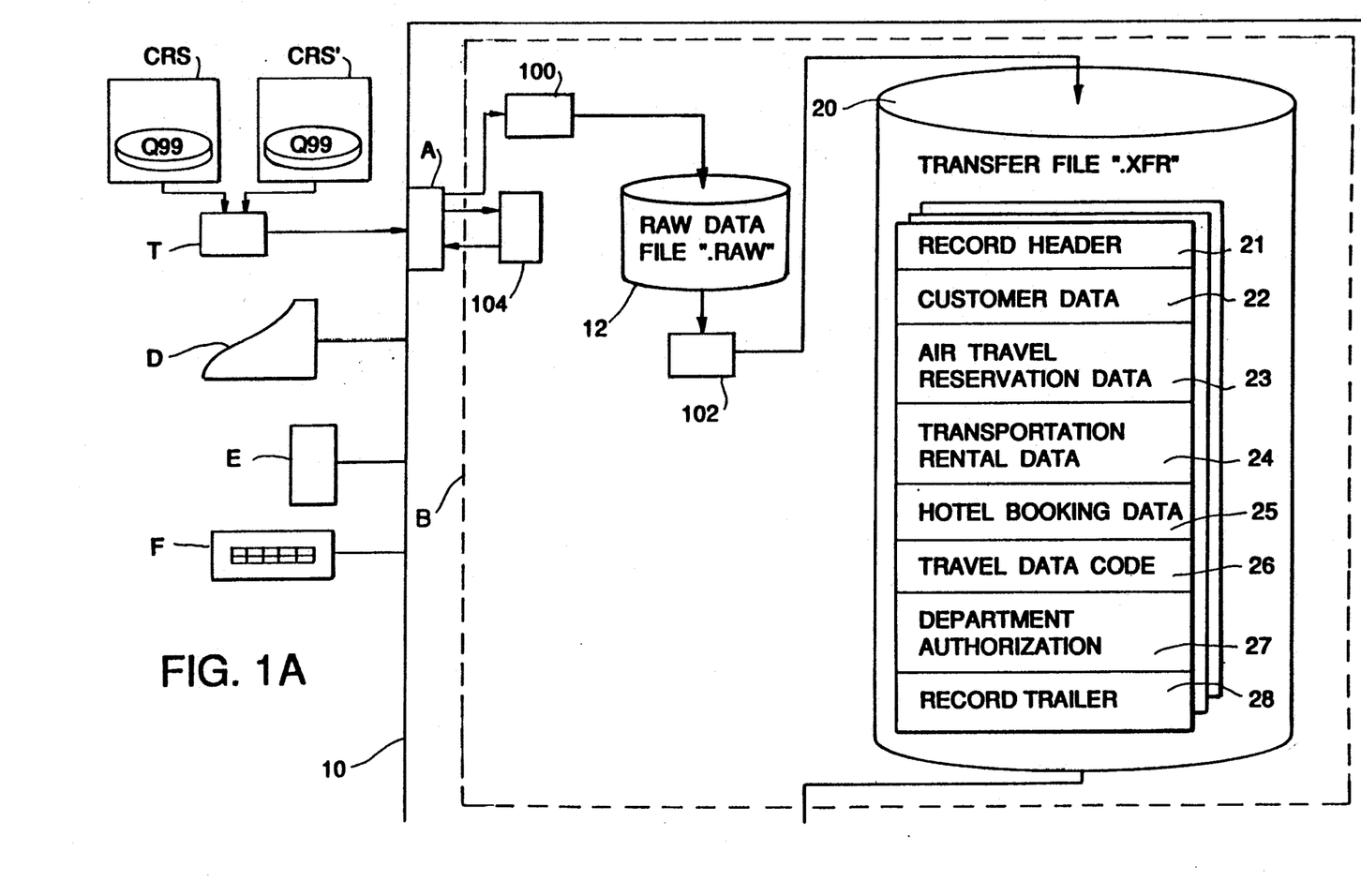
FIGS. 1a and 1b are an overall system view of the travel reservation record keeping system of the invention.
Figure 1B:
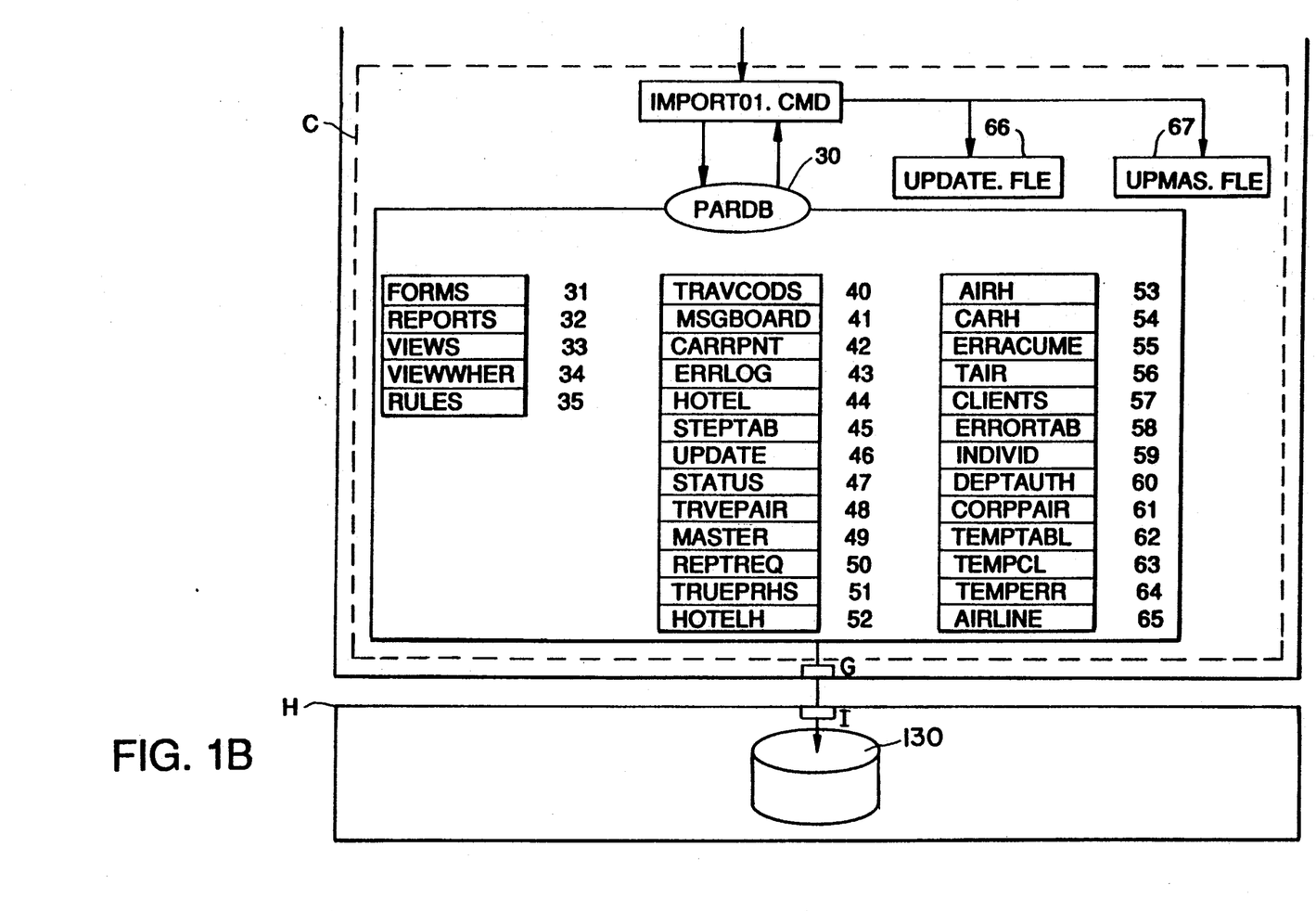
Figure 2A:
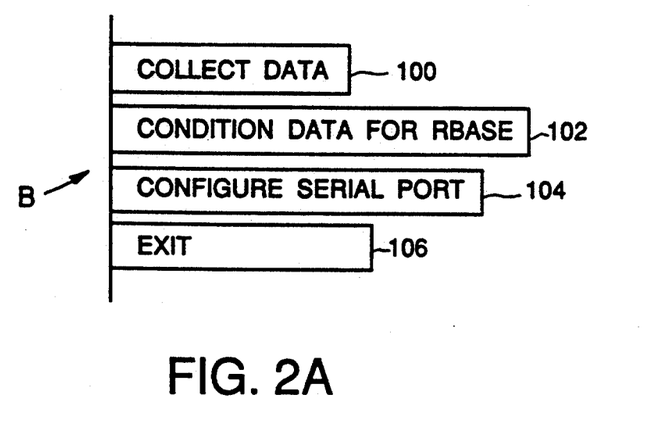
FIGS. 2A and 2B are menu charts of respective control portions of the record keeping system.
Figure 2B:
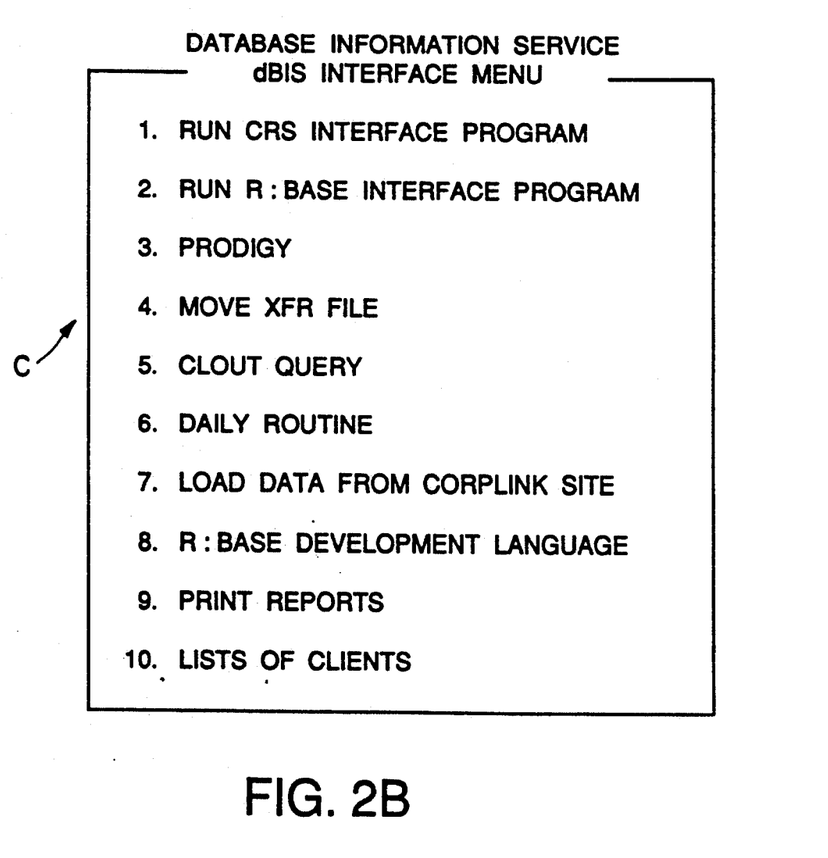

Referring to FIGS. 1a, 1b and 2B, the main relational database control C system has eight user options: run CRS interface program, run R:Base interface program, prodigy, move XFR file, CLOUT query, daily routine, load data from Corplink site, R:Base development language, print reports, and lists of clients.

Figure 7:
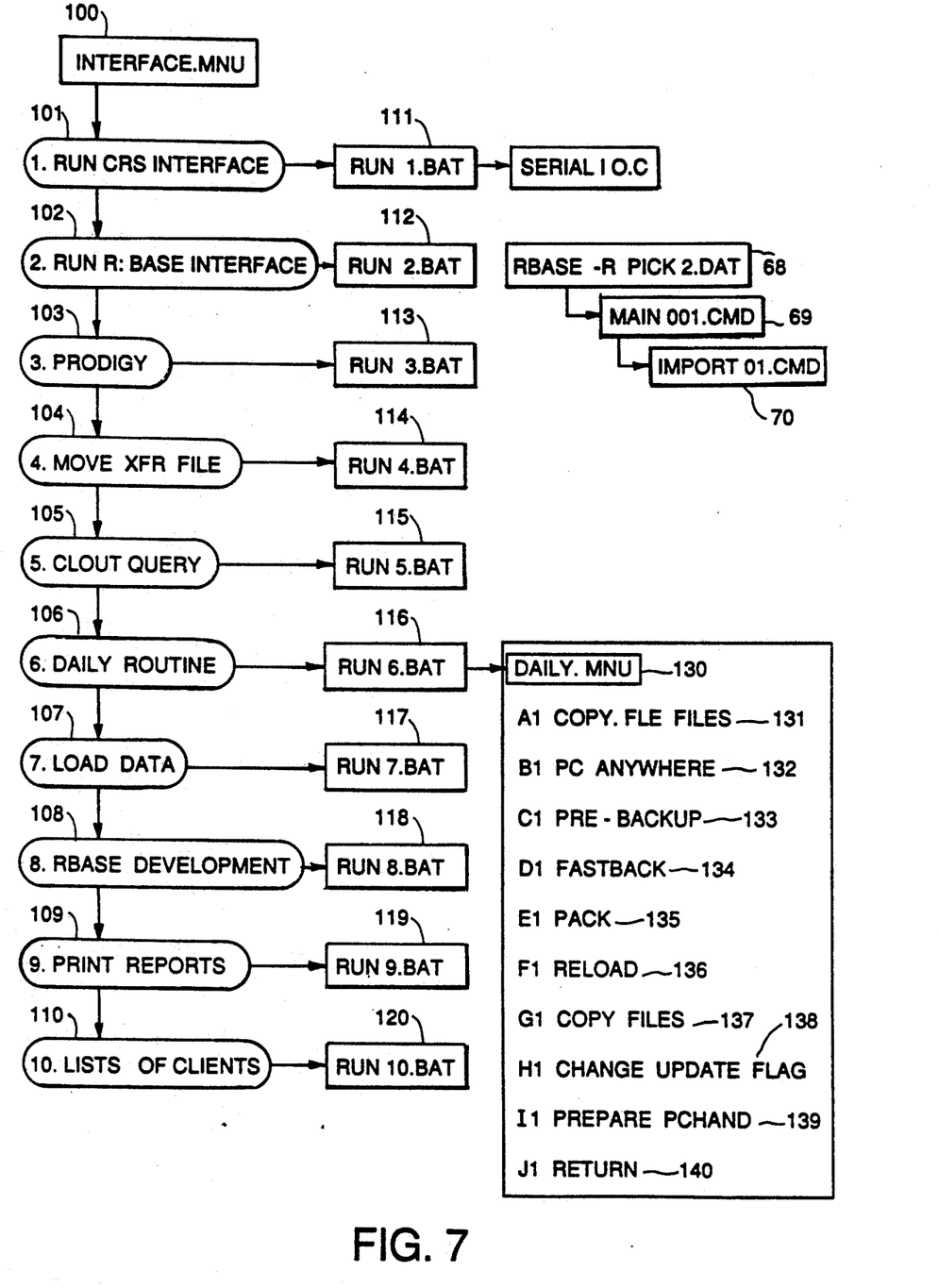
FIG. 7 is a menu and command flow for a typical R:BASE interface session.

The second operator option, Run R:Base Interface Program, is used to read the transfer file 20 created in the serial interface control B portion of the system (".XFR") and place this information in temporary database table Temptabl 62. FIG. 7 outlines the interface menu/command structure of the user options. A selection "2" from the menu shown in FIG. 2b results in the system running 2.BAT 112. The imported information is validated and an error log is sent to the printer D.

Figure 6:
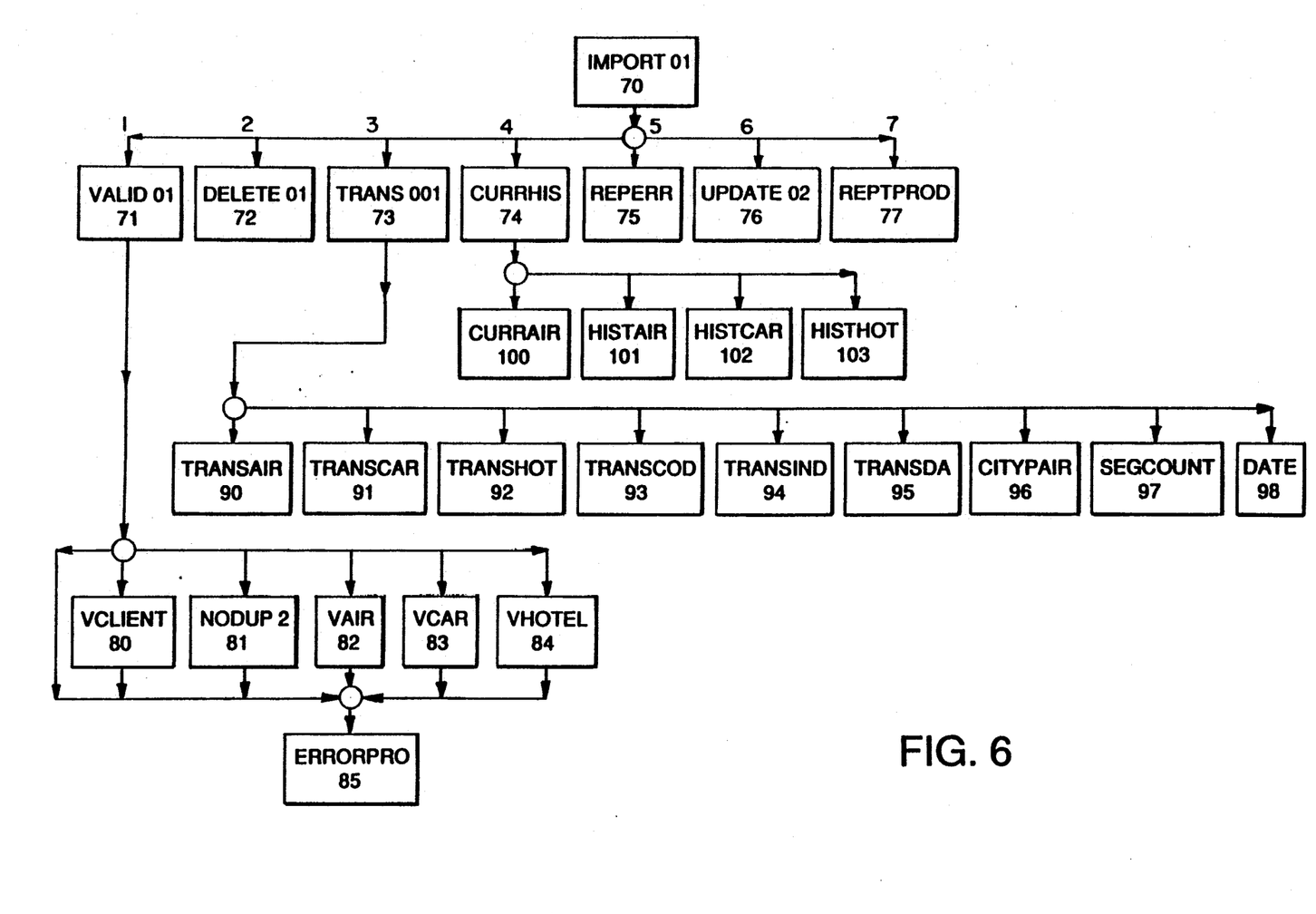
FIG. 6 is a flowchart of the database input procedure which processes and validates table fields for data integrity.

The batch file 2.bat 112 calls R:BASE with the input switch Pick2.dat 68, which in turn calls the input and validation procedure. Import01.CMD 70 (Appendix IIIb) is shown in FIG. 6 and is the main program that calls the following 9 subprograms: VALID01 71; DELETE01 72; TRANS001 73; CURRHIS 74; REPERR 75; UPDATE02 76; and, REPTPROD 77. Import01.CMD 70 also does the following:

|  |  |
|---|---|
|  | 1. Changes the steps in the STEPTAB 45 table. |
|  | 2. Checks to see if error tables 55, 58 are empty. |
|  | 3. Loads the TEMPTABL 62 with the data captured from the serial interface system and stored in the ".XFR" file 20. |
|  | 4. Shows the number of PNRs (passenger name records) in TEMPTABL 62 before validations. |
|  | 5. Gets correct processing date. |
|  | 6. Fills in times and calculates error totals for the STATUS TABLE 47. |
| VALID01 71- | Calls the following validation subprograms and also does the following: |
|  | 1. Checks for a null type field. If present, error code "10" is recorded. |
|  | 2. Checks for a null reference number. If present, error code "00" is recorded. |
|  | 3. Checks for no "E" type with a "B" type - error code "01". |
|  | 4. Checks for an illegal type in the type field - error code "09". |
| VCLIENT 80-P- | Checks for a to or for clause error and if there is one it calls ERRORPRO 85 with error code "13". Checks to see that all key fields are not null and if they are not then checks to see if the company or first word of the company is in the client table. If the company is not in the client table then ERRORPRO 85 is called with error code "11". If the first word of the company is found in the client table then the client code in TEMPTABL 62 is changed to the client code in the client table 57. |
| NODUP2 81-P- | If no errors were found in VCLIENT 80 and there is more than one "E" type record for a PNR then this program deletes everything after the first "E" record for the PNR to get rid of duplicates. |
| VAIR 81-A- | Fixes 12:00NM to 12:00PM for arrive time and depart time. If there is no arrive time calls ERRORPRO 85 with a "05" error code - air data error. Checks for "OPEN" in time and skips it if arrive date is not on record then it makes arrive date equal to depart date. If arrive city of depart city fails then it calls ERRORPRO as with a "05" error code - air data error. |
| VCAR 83-T- | Checks to see if all fields are there and in correct format. Checks to see if fare is really confirmation number. Checks to see if arrive date, company name, depart date, fare or location fails. |
| VHOTEL 84-N- | Same as VCAR 83 except it flags "07" hotel data error. |
| ERRORPRO 85- | Depending on errorcode. It fills ERRLOG 43 with the Ref#, error message, and current date and appends TEMPTABL 62 to ERRORTAB 58 and deletes from TEMPTABL 62. If the error is a car or hotel error then only the car or hotel segment is deleted. |
| DELET01 72- | Deletes PNRS already in the database 30 so that there are no duplicates and the most current PNR is kept in the database- Does not delete from INDIVID 59 |
| TRANS001 73- | Depending on the segment type, it runs different commands to transfer data from TEMPTABL 62 to appropriate tables. |
| TRANSAIR 90-M- | In TEMPTABL 62 where type EQ "A" loads TAIR 56. |
| TRANSCAR 91-T- | In TEMPTABL 62 where type EQ "T" loads CARRENT 42. |
| TRANSHOT 92-H- | In TEMPTABL 62 where type EQ "H" loads HOTEL 44. |
| TRANSCOD 93-D- | In TEMPTABL 62 where type EQ "D" loads the travel code to the TRAVCODS 40 table. |
| TRANSIND 94-P- | In TEMPTABL 62 where type EQ "P". If the ref# is already in INDIVID 59 then it just updates the MASDATCH field, MASTIMCH field, first and last name fields, and company and update flag fields. Otherwise it loads INDIVID 59. |
| TRANSDA 95-Z- | Transfers department and authorization numbers from the TEMPTABL 62 to the DEPTAUTH 60 table. |
| CITYPAIR 96- | Makes the connects between air flights. If there are less than three segments then there are no connects. If there are 3 hours or less between the depart time of one flight and the arrive time of the previous flight then the previous flight is a connect and the connect field is set to 1. Otherwise it is not a connect and the connect field is set to 0. |
| SEGCOUNT 97- | Numbers the segments in ascending order in the TAIR 56 table sorted by ref#, depart date, and depart time. |
| DATE 98- | In TAIR 56 where arrive date fails, it sets arrive date equal to depart date. |
| CURRHIS 74- | Loads the current tables from the T table and the historical tables from the current tables. |
| CURRAIR 100- | Loads AIRLINE 65 from TAIR 56. |
| HISTAIR 101- | Appends AIRLINE 65 to AIRH 53 and then deletes from AIRLINE 65 where the air depart date is less than the current system date. If one segment is historical then all segments for the ref# are moved to historical. |
| HISTCAR 102- | Same as above except it uses CARRENT 42 and CARH 54. |
| HISTSHOT 103- | Same as above except it uses Hotel 44 and HOTELH 52. |
| REPERR 75- | Forms TEMPERR 64 by intersecting ERRLOG 43 and ERRORTAB 58, makes error reports and loads the ERRACUME 55 table. |
| UPDATE02 76- | For every company in the update table it checks for a valid client code. If the client code in the update table is not valid it prints an error message and pauses. Otherwise, it changes all the update flags in INDIVID 59 for that company from "N" to "A" then for all where flag EQ "A", changes flags from "N" to "A" in AIRLINE 65, CARRENT 42, HOTEL 44, AIRH 53, CARH 54, HOTELH 52, DEPTAUTH 60, and TRAVCODS 40. It then unloads all records in these tables where the update flag equals "A" to UPDATE.FLE 66. Then the ref#'s for these records are unloaded to UPMAS.FLE 67 to delete repeats on the customer end. Then in all the tables where update flag is "A" it changes the update flag to "C" for complete. |
| REPTPROD 77- | Sets RPTCOMP, RPTCOMP2, and DATESTR and runs all reports in the |

Selecting daily routine 106 from the menu illustrated in FIG. 2a results in the system running 6.BAT 116 as illustrated in FIG. 7. When 6.BAT 116 runs, a DAILY.MNU 130 is displayed having the selections of copy all FLE files to diskette, PC anywhere, prebackup, fastback backup, pack, reload, copy files for clients, changing update flag, prepare PChand file for matrix, and return to main menu. The menu, batch, and command files used with the preferred embodiment are detailed in Appendix III. In general, the interface menu/command structure illustrated in FIG. 7 is practiced by the travel reservation record keeping system 10 to generate an UPDATE.FLE 66 and a UPMAS.FLE 67 file for downloading to the remote intelligent device H. The UPDATE.FLE 66 and UPMAS.FLE 67 files are created using the ordinary R:Base unload command.

Figure 8:
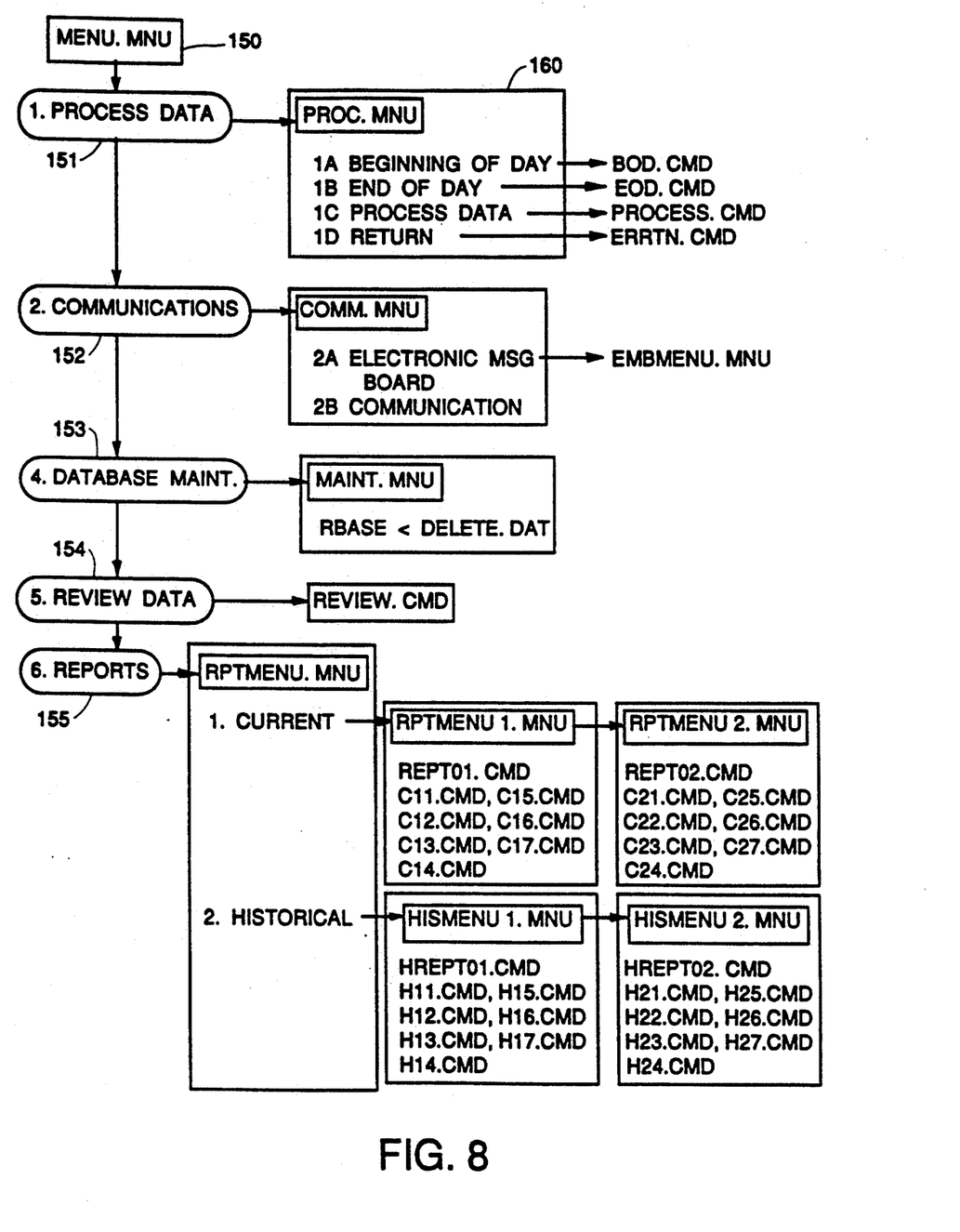
FIG. 8 is a menu and command flow for a typical R:BASE corporate link session.

Referring now to FIG. 8, the corporate link menu/command structure is illustrated. The menu, command, and data files used in the preferred embodiment are detailed in Appendix IV. Initially, a menu MENU.MNU 150 is displayed at the remote intelligent device H, which may be an IBM PC or similar equipment. The remote device H is provided with a database 130 which substantially parallels the database 30 within the record keeping system 10. The initial menu presented to an operator offers the selections of process data, communications, query data, database maintenance, review data, reports, commercial and corporate aircraft scheduling, and return to DOS.

Selecting process data 151 presents the PROC.MNU structure 160 which, in turn, offers the selections of beginning of day, end of day, process data, and return to main menu. These procedures are used locally by the intelligent device H to read the files created within the record keeping system 10 and into the local database 130. The sequential selection of the options within the PROC.MNU structure 160 generally executes the daily processing required for operation of the overall system.

Reports may be generated within the remote intelligent device H by selecting six reports 155 from the MENU.MNU 150. The various reports available within the preferred embodiment are listed in Appendix IV, but may be tailored to particular applications as desired by an end user.

Reports are also available within the record keeping system 10 by selecting "9" print reports from the INTERFACE.MNU 100. The report command file available within the record keeping system 10 are listed in Appendix IVb. Obviously, other reports may be created by one of ordinary skill in the art through the R:Base system to suit a particular application.

---

The reports of the preferred embodiment are:
Airfare Analysis
Corporate Aircraft - Without Connects
City-Pair Quality Control - True City Pairs
Quality Control Air (Aircode)
No Car/No Hotel
Car Summary
Hotel Summary
    The reports may be briefly described as follows:
Airfare Analysis:
    Reports on current reservations held by each traveler alphabetically.
    Lists reservation detail for each traveler.
    Includes pricing available at time of reservation.
    Produced weekly for operation management review.
Corporate Aircraft - Without Connects:
    Report data is prior to travel being ticketed.
    Provides individual travel information by depart date.
    Can be produced on specified depart dates only.
    Reports on destination routing only without listing connections required on commercial flight.
Quality Control -True City Pairs:
    Reports on reserved travel not yet ticketed.
    Separated by actual depart city - destination city (exclusive of connection information),
    Produced daily on pre-ticketed reservations.
    Summary produced weekly for management review.
Quality Control Air (Air Code):
    Produces detailed information on reservations by a specific air code.
    Allows for pinpoint monitoring of travel patterns.
No Car/No Hotel:
    Provides summary of reservations to date booking overnight flights without a car and/or hotel reservation.
    Identifies passenger, depart and return dates, destination and reason (air) code.
Car Summary:
    Report sorts by car agency, or
        location or,
        pickup date.
    Lists car reservation detail.
    Sub-totals each car primary sort.
    Post ticket (history) reports available.
Hotel Summary:
    Report sorts by hotel, or
        check-in date, or
        loation (sample).
    Lists hotel reservation detail such as: room type, nights, cost per room.
    Sub-totals for each hotel facility.
    Post ticket (history) reports available in same format as pre-ticket reports.

---

Having thus described the invention, we claim:

1. A pre-travel reservation analyzing method in an information processing system comprising the steps of:
    receiving a first plurality of travel reservation data sets comprising scheduled travel itineraries from a first computer reservation system, each of the first plurality of data sets having a plurality of first travel itinerary data items corresponding to a first set of individual travelers;
    storing the first plurality of data sets in a memory of the system;
    receiving a second plurality of travel reservation data sets from a second computer reservation system, each of the second plurality of data sets having a plurality of second travel itinerary data items corresponding to a second set of individual travelers;
    storing the second plurality of data sets in the memory of the system;
    selecting predetermined travel itinerary data items from the first and second plurality of travel reservation data sets;
    arranging the selected items within the memory for ready importation into a relational database;
    importing the arranged items into the relational database;

storing the imported items in a plurality of tables, each for storing portions of the travel reservation data sets corresponding to selected single travel components including tables for air, hotel, or automobile travel reservations;

generating a report from the relational database; and, determining from the generated report a travel compliance of the first and second sets of individual travelers with respect to a predefined travel policy.

2. The pre-travel reservation analyzing method according to claim 1 further comprising:

defining the travel policy based upon a preexisting contractual agenda; and, generating a contract compliance report from the relational database to indicate non-compliance with the travel policy for each of the individual travelers when preselected ones of said travel itinerary data items do not comply with the travel policy.

3. The pre-travel reservation analyzing method according to claim 1 wherein the first plurality of travel reservation data sets are received at a first predetermined time and wherein the second plurality of travel reservation data sets are received at substantially the first predetermined time.

4. The pre-travel reservation analyzing method according to claim 1 wherein the step of importing comprises the steps of:

loading a temporary table within the relational database with the imported arranged items;

validating ones of the items loaded in the temporary table against predetermined criteria for conformity with the criteria; and, writing to an error log table when the ones validated do not conform with the criteria.

5. The pre-travel reservation analyzing method according to claim 1 wherein the step of storing comprises the steps of loading a current airline table within the relational database with ones of said travel itinerary data items relating to airline reservation information; loading a current automobile table within the relational database with ones of said travel itinerary data items relating to automobile reservation information; and, loading a current hotel table within the relational database with ones of said travel itinerary data items relating to hotel reservation information, and wherein the step of generating a report comprises the step of generating an airline reservation quality control report having a row for air travel reservations for each of said individual travelers and a column for comparing fares between each of the travelers.

6. The pre-travel reservation analyzing method according to claim 1 wherein the step of storing comprises the steps of appending an historical airline table within the relational database with current ones of said travel itinerary data items relating to airline reservation information; appending an historical automobile table within the relational database with current ones of said travel itinerary data items relating to automobile reservation information; and, appending an historical hotel table within the relational database with current ones of said travel itinerary data items relating to hotel reservation information, and wherein the step of generating a report comprises the step of generating an historical report of air travel reservations for each of said individual travelers.

7. A pre-travel reservation analyzing method in an information processing system comprising the steps of:

receiving a plurality of travel reservation data sets from a computer reservation system, each of the plurality of data sets having a plurality of travel itinerary data items corresponding to a set of individual travelers;

storing the plurality of data sets in a memory of the system;

selecting predetermined travel itinerary data items from the plurality of travel reservation data sets;

arranging the selected items within the memory for ready importation into a relational database;

importing the arranged items into the relational database;

storing the imported items in a plurality of tables, each for storing portions of the travel reservation data sets corresponding to selected single travel components including tables for air, hotel, or automobile travel reservations;

generating a report from the relational database; and, determining from the generated report a travel compliance of the travelers with respect to a predefined travel policy.

* * * * *